United States Patent
Hirai

(10) Patent No.: US 8,548,094 B2
(45) Date of Patent: Oct. 1, 2013

(54) TRANSMISSION DEVICE AND MODULATION METHOD

(75) Inventor: Hiroaki Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 381 days.

(21) Appl. No.: 12/865,526

(22) PCT Filed: Jan. 29, 2009

(86) PCT No.: PCT/JP2009/051500
§ 371 (c)(1),
(2), (4) Date: Jul. 30, 2010

(87) PCT Pub. No.: WO2009/096488
PCT Pub. Date: Aug. 6, 2009

(65) Prior Publication Data
US 2011/0007840 A1    Jan. 13, 2011

(30) Foreign Application Priority Data
Jan. 31, 2008 (JP) .................................. 2008-021301

(51) Int. Cl.
*H04L 27/36* (2006.01)
(52) U.S. Cl.
USPC ............................ 375/298; 375/261; 332/103
(58) Field of Classification Search
USPC ................. 375/295, 298, 300, 259–261, 268, 375/281; 332/103, 149
See application file for complete search history.

(56) References Cited

U.S. PATENT DOCUMENTS

| 4,571,549 | A | * | 2/1986 | Lods et al. | 332/103 |
| 5,379,322 | A | * | 1/1995 | Kosaka et al. | 375/296 |
| 5,412,351 | A | * | 5/1995 | Nystrom et al. | 332/103 |
| 6,606,010 | B1 | * | 8/2003 | Poklemba et al. | 332/103 |
| 6,628,727 | B1 | * | 9/2003 | Wu et al. | 375/281 |
| 7,031,370 | B1 | * | 4/2006 | Fukumasa | 375/141 |

(Continued)

FOREIGN PATENT DOCUMENTS

| JP | 2004 80834 | 3/2004 |
| WO | 2005 004367 | 1/2005 |

OTHER PUBLICATIONS

Choi, Soo Ki et al., "Rotated Multidimensional Modulation for Spatial Multiplexing Systems", IEEE 58th Vehicular Technology Conference, 2003. VTC 2003—Fall, vol. 1, pp. 246-250, (Oct. 2003).

(Continued)

*Primary Examiner* — Jean B Corrielus
(74) *Attorney, Agent, or Firm* — Oblon, Spivak, McClelland, Maier & Neustadt, L.L.P.

(57) ABSTRACT

A transmission device includes an RQAM modulating unit that has an S/P that divides a transmitting signal indicating information to be transmitted into a first signal and a second signal, a mapping unit that maps the first signal into a first in-phase component and a second in-phase component and the second signal into a first orthogonal component and a second orthogonal component by a predetermined mapping system, a P/S that generates a first modulated signal including the first in-phase component and the first orthogonal component and a second modulated signal including the second in-phase component and the second orthogonal component, an IFFT that transmits the first modulated signal and the second modulated signal, a DAC, an LPF, a Mixer, a BPF, and a LOCAL OSCILLATOR.

7 Claims, 14 Drawing Sheets

(56) References Cited

U.S. PATENT DOCUMENTS

| | | | |
|---|---|---|---|
| 7,379,509 B2* | 5/2008 | Pao et al. | 375/298 |
| 7,609,779 B2* | 10/2009 | Wagh et al. | 375/295 |
| 2001/0016016 A1* | 8/2001 | Eidson et al. | 375/302 |
| 2003/0011861 A1* | 1/2003 | Casagrande | 359/200 |
| 2003/0039322 A1* | 2/2003 | Murakami et al. | 375/329 |
| 2004/0128610 A1* | 7/2004 | Wei | 714/792 |
| 2006/0022765 A1* | 2/2006 | Farag | 332/103 |
| 2006/0189282 A1* | 8/2006 | Hasegawa et al. | 455/127.1 |
| 2007/0064831 A1* | 3/2007 | Bjerke et al. | 375/267 |
| 2007/0171961 A1* | 7/2007 | Farag et al. | 375/146 |
| 2007/0189361 A1* | 8/2007 | Sugiyama et al. | 375/132 |
| 2009/0003466 A1* | 1/2009 | Taherzadehboroujeni et al. | 375/260 |
| 2009/0141828 A1* | 6/2009 | Huang et al. | 375/296 |

OTHER PUBLICATIONS

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications High-speed Physical Layer in the 5 GHz Band", IEEE STD 802.11a-1999, 32 pages, (1999).

Supplementary European Search Report issued on Jul. 18, 2013, in corresponding European Appln No. 09 70 6325.9 (6 pages).

* cited by examiner

FIG.8
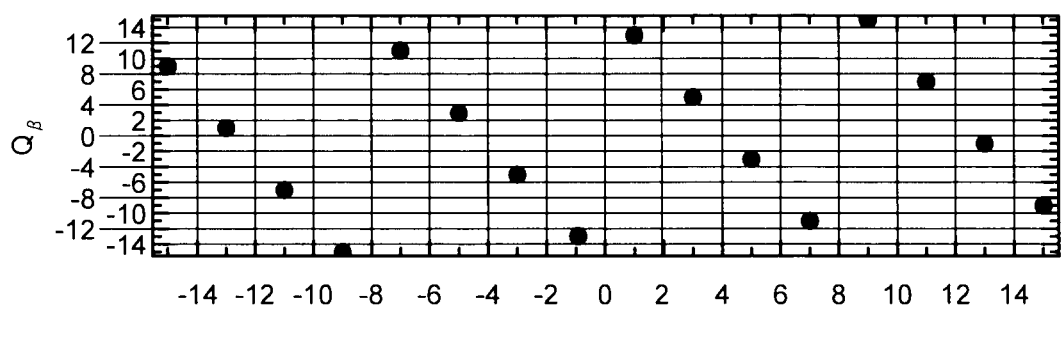
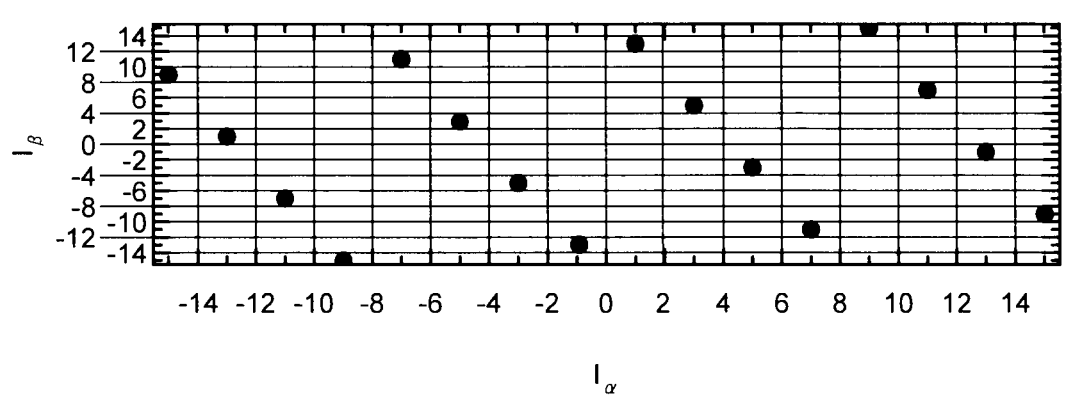

PRIOR ART

US 8,548,094 B2

TRANSMISSION DEVICE AND MODULATION METHOD

TECHNICAL FIELD

The present invention relates to a transmission device and a modulation method for modulating wireless signals, and more particularly relates to a transmission device and a modulation method applied to a wireless communication system or the like utilized in a multipath environment.

BACKGROUND ART

Communication systems with increased resistance to frequency-selective fading caused by multipaths by using multi-carriers like IEEE (Institute of Electrical and Electronics Engineers) 802.11a, which is a wireless LAN (Local Area Network) standard, are used mainly in the field of high capacity wireless communications.

As such a communication system, for example, OFDM (Orthogonal Frequency Division Multiplexing) has been known. One of characteristics of the communication system using the multi-carriers such as OFDM is that frequency selective fading generated in a multipath environment may be handled as flat fading in each carrier. Further, with the increase of communication capacity a wide band is used, thus it is another characteristic to provide the Rayleigh distribution in a frequency axis direction.

There are four types of modulation systems prescribed in IEEE 802.11a, namely, BPSK (Binary Phase Shift Keying), QPSK (Quadrature Phase Shift Keying), 16QAM (Quadrature Amplitude Modulation), and 64QAM. By changing a coding rate of error correction, a desired communication speed may be selected adaptively among eight communication speeds depending on a channel state.

FIG. 14 is a schematic diagram of a communication image in a multipath environment. FIG. 14 is an example of mapping 16QAM on all carriers. A sub-carrier number $\alpha$ (SC[$\alpha$] in FIG. 14) indicates a relatively favorable communication characteristic. A sub-carrier number $\beta$ (SC[$\beta$] in FIG. 14) indicates a poor communication characteristic because it corresponds to a plunge of frequency. IEEE 802.1 is easily realized because the same modulation system is assigned to all sub-carriers. In the multipath environment; however, it is highly possible that a bit assigned to a plunged sub-carrier generates an error.

As described above, the communication system according to IEEE 802.11a may realize wide band transmission by providing multi-values such as 16QAM and 64QAM according to favorable communication environments such as when a distance between communication devices is short and when interference waves do not exist. In the multipath environment; however, a transmission SN of a particular carrier may occasionally be deteriorated. To compensate for the deterioration, receiving or transmitting diversity, a plurality of repeated transmissions, and error corrections have been performed. For example, Patent Document 1 discloses a technique for rotating a phase of a carrier when obtaining the diversity effect in a time direction.

Patent Document 1: International Publication No. WO2005/004367 pamphlet

DISCLOSURE OF INVENTION

Problem to be Solved by the Invention

According to the conventional techniques mentioned above; however, the method of performing receiving or transmitting diversity requires a plurality of antennas and a plurality of RF (Radio Frequency) units, and this results in a drawback such as an increase in device costs. The method of performing a plurality of repeated transmission and error corrections has such a drawback as reducing communication speed. In systems having a large number of users, a decrease in communication speed not only limits a communication amount of each user but also leads to an increase in communication delay. Thus, in applications requiring real time operations, there has been a problem of causing deterioration in communication quality.

The present invention has been made in view of the above problems, and an object of the present invention is to provide a transmission device and a modulation system in which communication characteristics are improved in a multipath environment.

Means for Solving Problem

To solve the above problems and achieve the object, a transmission device for transmitting a modulated signal including an in-phase component and an orthogonal component, the transmission device includes: a dividing unit that divides a transmitting signal indicating information to be transmitted into a first signal and a second signal; a mapping unit that maps the first signal into a first in-phase component and a second in-phase component by a predetermined mapping system and the second signal into a first orthogonal component and a second orthogonal component by the mapping system; a generating unit that generates a first modulated signal including the first in-phase component and the first orthogonal component and a second modulated signal including the second in-phase component and the second orthogonal component; and a transmitting unit that transmits the first modulated signal and the second modulated signal.

Effect of the Invention

According to the present invention, communication characteristics in a multipath environment can be improved.

BRIEF DESCRIPTION OF DRAWINGS

FIG. 8 is a schematic diagram of an image of a received signal by the 16RQAM mapping according to the first embodiment.

Figure 1:
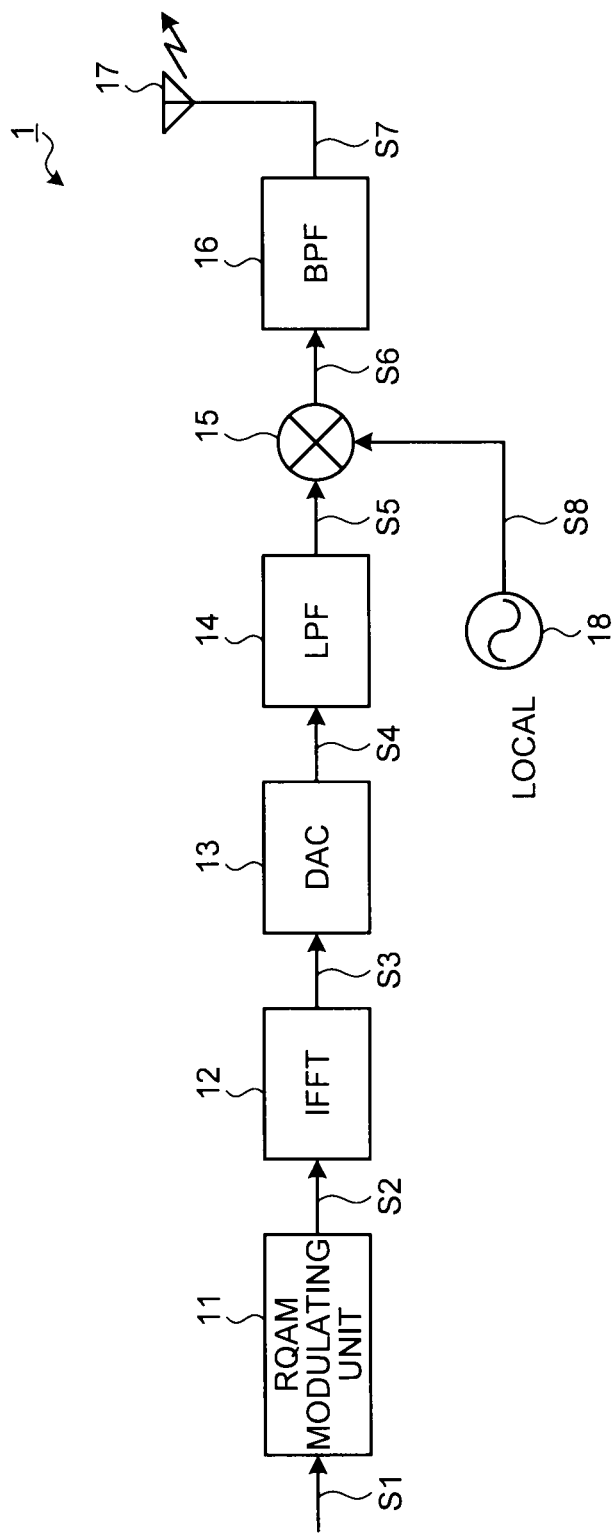
FIG. 1 is a block diagram of a transmission device according to a first embodiment.

EXPLANATIONS OF LETTERS OR NUMERALS 1, 2, 3, 4 Transmission device
11 RQAM modulating unit
12 IFFT
13 DAC
14 LPF
15 Mixer
16 BPF
17 Antenna
18 LOCAL OSCILLATOR
21 Interleaving unit
31 Coding unit
41 RQAM modulating unit
42 LPF
101, 102, 103 S/P
104, 105 Mapping unit
106, 107, 108 P/S
S1 to S8 Signal
S11 I-axis information component
S12 Q-axis information component
S13, S14 I-axis information component
S15, S16 Q-axis information component
S17, S18 I-axis frequency-amplitude component
S19, S20 Q-axis frequency-amplitude component
S21, S22 Frequency signal component
S25, S31, S41, S42 Signal

BEST MODE(S) FOR CARRYING OUT THE INVENTION

Exemplary embodiments of a transmission device and a modulation method according to the present invention will be explained below in detail with reference to the accompanying drawings. The present invention is not limited to the embodiments.

First Embodiment

A transmission device according to a first embodiment maps transmitting signals in such a manner to straddle a plurality of sub-carriers in multi-carrier communications using a mapping system provided by modifying a conventional QAM mapping. In this manner, the diversity effect and multi-values may be achieved at the same time. Communications that exhibit superior characteristics to the conventional system and realize high capacity communications in the multipath environment may be realized. As a result, communications with reduced delay and high capacity can be realized in the multipath environment as compared to systems using conventional techniques.

FIG. 1 is a block diagram of a transmission device 1 according to the first embodiment. As illustrated in FIG. 1, the transmission device 1 includes an RQAM (Rotated Quadrature Amplitude Modulation) modulating unit 11, IFFT (Inverse Fast Fourier Transform) 12, a DAC (Digital to Analog Converter) 13, an LPF (Low Pass Filter) 14, a Mixer 15, a BPF (Band Pass Filter) 16, an antenna 17, and a LOCAL OSCILLATOR 18.

The RQAM modulating unit 11 modulates signals using RQAM obtained by improving 16QAM or 64QAM. Details of the configuration of the RQAM modulating unit 11 will be described later.

The IFFT 12 performs multiplexing in a time direction at the time of multi-carrier transmission. Specifically, the IFFT 12 performs an inverse fast Fourier transform process to an inputted frequency signal and outputs a resultant time signal.

The DAC 13 is a block for converting a digital signal inputted by the IFFT 12 into an analog signal. The DAC 13 is connected to the LPF 14 and the converted analog signal is inputted to the LPF 14.

The LPF 14 is a block for attenuating an alias component or a harmonic component of the analog signal inputted by the DAC 13. The LPF 14 is connected to the Mixer 15 and a signal that passes through the LPF 14 is inputted to the Mixer 15.

The LOCAL OSCILLATOR 18 is a block for generating a center frequency used at the time of signal transmission. The LOCAL OSCILLATOR 18 is connected to the Mixer 15 and inputs a signal of a generated center frequency to the Mixer 15.

The Mixer 15 is a block for converting a frequency of the signal inputted by the LPF 14 into a high frequency using the center frequency generated by the LOCAL OSCILLATOR 18. The Mixer 15 is connected to the BPF 16 and inputs the signal converted by the Mixer 15 to the BPF 16.

BPF 16 is a block for removing frequencies of the signal inputted by the Mixer 15 other than the frequency used at the time of signal transmission. The BPF 16 is connected to the antenna 17 and a signal that passes through the BPF 16 is transmitted via the antenna 17.

In FIG. 1, various signals (signal flows) processed in the transmission device 1 are depicted as signals S1 to S8. The signal S1 indicates an information bit series inputted to the transmission device 1 as information to be transmitted. The signal S2 indicates a digital signal (a modulated signal) obtained by modulating the signal S1 for transmitting at various frequencies. The signal S3 indicates a signal converted by the IFFT 12 from a frequency signal into a time signal. The signal S4 indicates a signal obtained by converting the signal S3 as a digital signal into an analog signal. The signal S5 indicates a signal obtained by attenuating unnecessary out-of-band signals from the signal S4. The signal S6 indicates a signal obtained by shifting the center frequency of the signal S5 to a high frequency. The signal S7 indicates a signal obtained by attenuating unnecessary out-of-band signals from the signal S6. The signal S8 is a signal indicating the center frequency used at the time of signal transmission.

Figure 2:
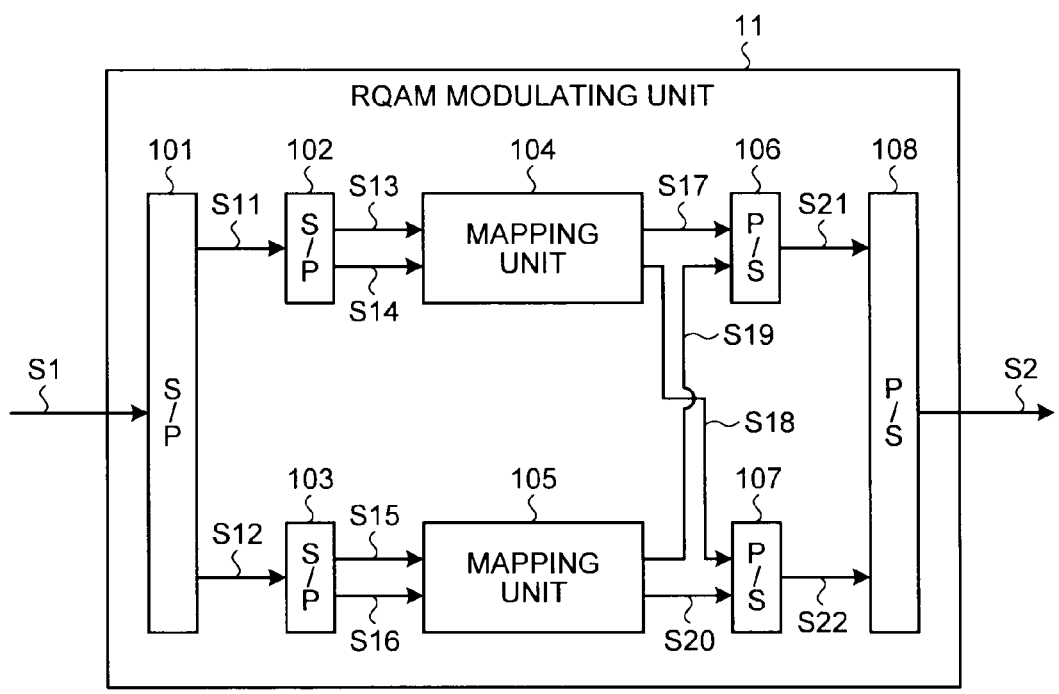
FIG. 2 is a block diagram of an RQAM modulating unit according to the first embodiment.

A detailed configuration of the RQAM modulating unit 11 is described next with reference to FIG. 2. FIG. 2 is a block diagram of the RQAM modulating unit 11 according to the first embodiment. As illustrated in FIG. 2, the RQAM modulating unit 11 includes Serial/Parallel converters (S/P) 101, 102, and 103, mapping units 104 and 105, and Parallel/Serial converters (P/S) 106, 107, and 108.

The S/P 101 distributes the signal S1 as an inputted information bit series (an information string in units of 8-bit in 16RQAM) into an I-axis information component S11 (an information string in units of 4-bit in 16RQAM) including in-phase components (hereinafter, "I-axis information components") of two sub-carriers and a Q-axis information component S12 (an information string in units of 4-bit in 16RQAM) including orthogonal components (hereinafter, "Q-axis information components") of two sub-carriers. The two sub-carriers are occasionally referred to as a sub-carrier α and a sub-carrier β.

The S/Ps 102 and 103 further distribute the distributed information for each sub-carrier. Specifically, the S/P 102 distributes the I-axis information component S11 into an I-axis information component S13 of a sub-carrier α (an information string in units of 2-bit in 16RQAM) and an I-axis information component S14 of a sub-carrier β (an information string in units of 2-bit in 16RQAM). The S/P 103 distributes the Q-axis information component S12 into a Q-axis information component S15 of the sub-carrier α (an information string in units of 2-bit in 16RQAM) and a Q-axis information component S16 of the sub-carrier β (an information string in units of 2-bit in 16RQAM).

The mapping units 104 and 105 perform mapping by a signal point arrangement mapping system in which signal points obtained by multiplying signal points of a conventional 16QAM mapping or 64QAM mapping by a predetermined matrix are arranged. Specifically, the mapping units 104 and 105 perform mapping by a mapping system (an RQAM mapping), which has an arrangement where each of the signal points is rotated by multiplying a matrix represented by the following expressions (1), (2), or (3).

$$\frac{1}{\sqrt{2^{2N}+1}}\begin{pmatrix} 2^N & 1 \\ 1 & -2^N \end{pmatrix} \quad (1)$$

$$\frac{1}{\sqrt{2^{2N}+1}}\begin{pmatrix} 2^N & -1 \\ 1 & 2^N \end{pmatrix} \quad (2)$$

$$\frac{1}{\sqrt{2^{2N}+1}}\begin{pmatrix} 2^N & 1 \\ -1 & 2^N \end{pmatrix} \quad (3)$$

The QAM mapping to be rotated is assumed to be $2^{2N}$ QAM mapping. That is, for the 16QAM mapping, 16RQAM mapping can be obtained by an expression (4) in which N=2 is substituted into the expression (1). For the 64QAM mapping, 64 RQAM mapping can be provided by an expression (5) in which N=3 is substituted into the expression (1).

$$\frac{1}{\sqrt{17}}\begin{pmatrix} 4 & 1 \\ 1 & -4 \end{pmatrix} \quad (4)$$

$$\frac{1}{\sqrt{65}}\begin{pmatrix} 8 & 1 \\ 1 & -8 \end{pmatrix} \quad (5)$$

As a result of such a mapping, when 2N-bit is transmitted, values projected into the respective axes are different from each other such as Xn={2k−1|N−1≤k≤N}.

The mapping unit 104 maps, by such an RQAM mapping, the I-axis information component S13 of the sub-carrier α and the I-axis information component S14 of the sub-carrier β into an I-axis frequency-amplitude component S18 of the sub-carrier α and an I-axis frequency-amplitude component S17 of the sub-carrier β.

The mapping unit 105 maps, by the RQAM mapping, the Q-axis information component S15 of the sub-carrier α and the Q-axis information component S16 of the sub-carrier β into a Q-axis frequency-amplitude component S19 of the sub-carrier α and a Q-axis frequency-amplitude component S20 of the sub-carrier β. A mapping unit that has a combined function of the mapping unit 104 and the mapping unit 105 may be provided. Details of the RQAM mapping performed by the mapping units 104 and 105 will be described later.

The P/S 106 converts the I-axis frequency-amplitude component S17 of the sub-carrier α and the Q-axis frequency-amplitude component S19 of the sub-carrier α, after the RQAM mapping, into a complex frequency signal component S21 of the sub-carrier α as a serial data series.

The P/S 107 converts the I-axis frequency-amplitude component S18 of the sub-carrier β and the Q-axis frequency-amplitude component S20 of the sub-carrier β, after the RQAM mapping, into a complex frequency signal component S22 of the sub-carrier β as a serial data series.

The P/S 108 combines the complex frequency signal component S21 of the sub-carrier α and the complex frequency signal component S22 of the sub-carrier β to output the signal S2 as a complex frequency signal component as a digital signal obtained by modulating the signal S1.

Figure 3:
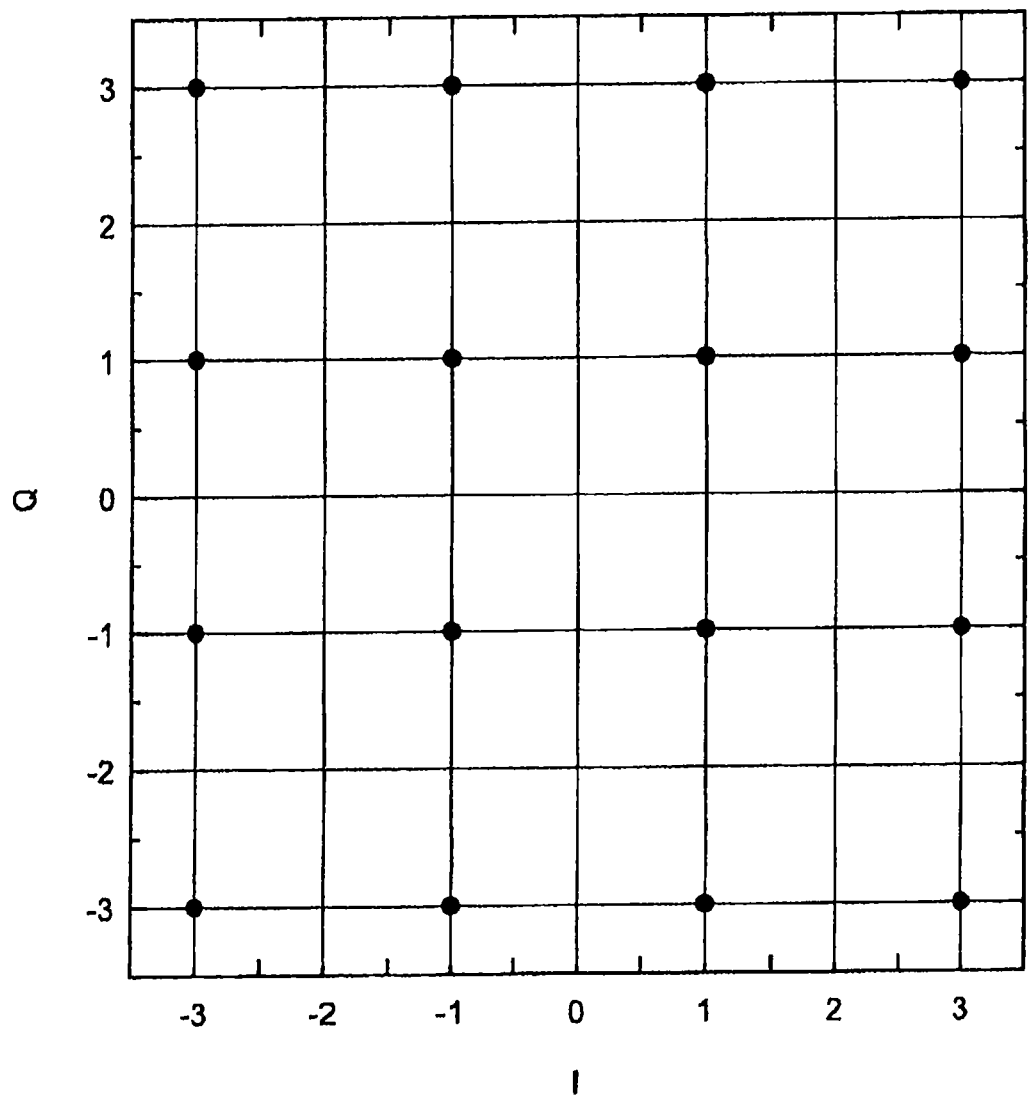
FIG. 3 depicts a signal point arrangement of a conventional 16QAM mapping.
Figure 4:
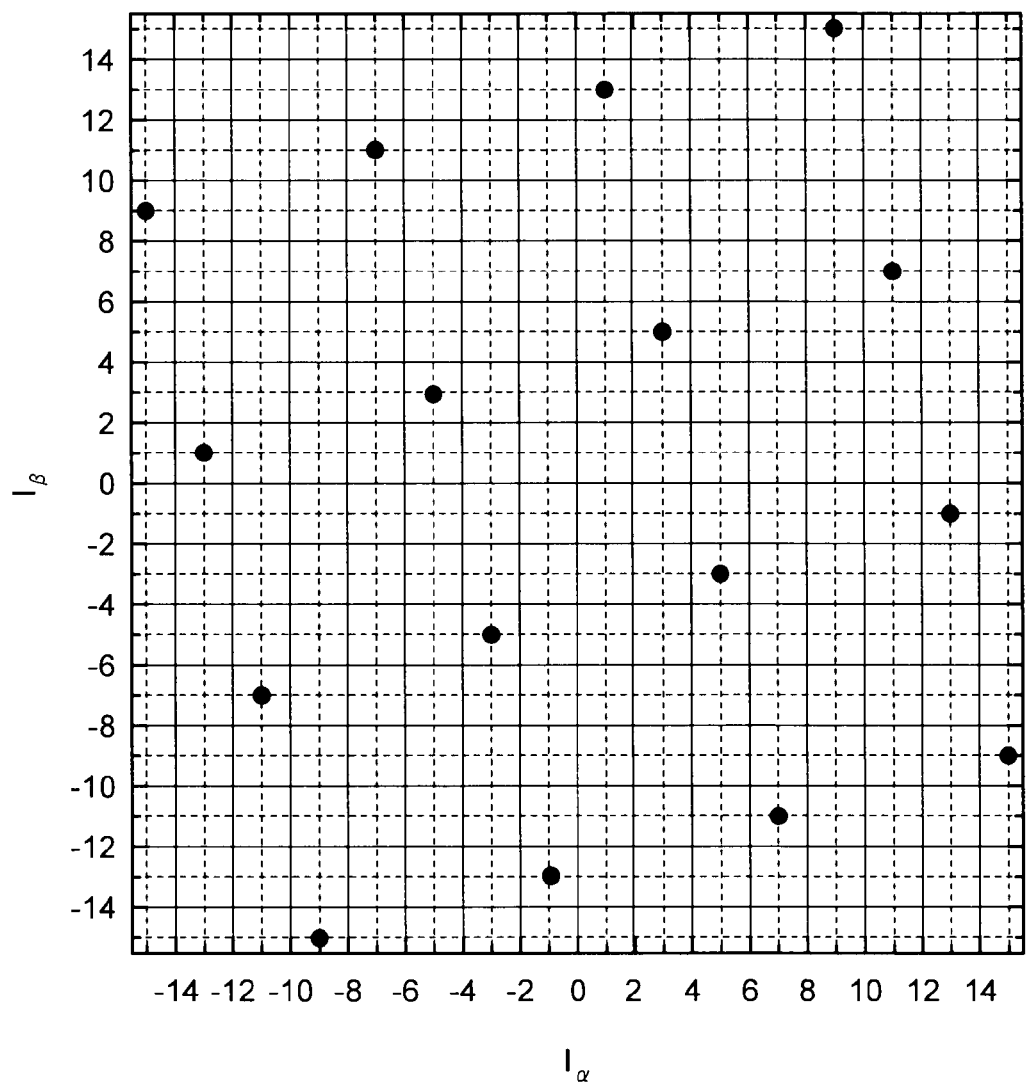
FIG. 4 is an example of a signal point arrangement of a 16RQAM mapping.

Details of a signal point arrangement of the RQAM mapping by the mapping units 104 and 105 will be described next. FIG. 3 depicts a signal point arrangement of the conventional 16QAM mapping. FIG. 4 is an example of a signal point arrangement of the 16RQAM mapping obtained by applying the expression (4) to the 16QAM mapping depicted in FIG. 3.

In practice, in order to provide a mean electric power of signal point 1, each of the I-axis values and Q-axis values in FIG. 3 is multiplied by a value of an expression (6) below. Similarly, each of the I-axis values and Q-axis values in FIG. 4 is multiplied by a value of an expression (7) below. FIGS. 3 and 4 depict values before multiplication of the respective values for the purpose of explanation.

$$\frac{1}{\sqrt{10}} \quad (6)$$

$$\frac{1}{\sqrt{170}} \quad (7)$$

While FIG. 4 is an example of a signal point arrangement of the mapping $I_\alpha$ indicating the I-axis information component of the sub-carrier α and $I_\beta$ indicating the I-axis information component of the sub-carrier β, similar signal point arrangement may be applied to the mapping of $Q_\alpha$ indicating the Q-axis information component of the sub-carrier α and $Q_\beta$ indicating the Q-axis information component of the sub-carrier β.

That is, the mapping unit 104 maps the I-axis information component S13 of the sub-carrier α inputted by the S/P 102 (corresponding to $I_\alpha$ in FIG. 4) and the I-axis information component S14 of the sub-carrier β inputted by the S/P 102 (corresponding to $I_\beta$ in FIG. 4) into I-axis frequency-amplitude components of the respective sub-carriers according to the RQAM mapping illustrated in FIG. 4.

The mapping unit 105 maps the Q-axis information component S15 of the sub-carrier α and the Q-axis information component S16 of the sub-carrier β inputted by the S/P 103 into Q-axis frequency components of the respective sub-carriers according to the RQAM mapping illustrated in FIG. 4.

The conventional QAM modulation system illustrated in FIG. 3 maps an inputted information bit series into an I-axis and a Q-axis of a sub-carrier. That is, for example, in the conventional 16QAM modulation system, an information bit series in units of 4-bit is inputted first. The 4-bit information string is distributed by the S/P into two components, which are the I-axis information component of a frequency and the Q-axis information component of a frequency. The I-axis information component and the Q-axis information component are then mapped by the 16QAM mapping illustrated in FIG. 3 into the I-axis frequency-amplitude component and the Q-axis frequency-amplitude component for each sub-carrier.

On the other hand, the modulation system according to the present embodiment illustrated in FIG. 4 performs a mapping in such combinations between the I-axis of the sub-carrier α and the I-axis of the sub-carrier β and between the Q-axis of the sub-carrier α and the Q-axis of the sub-carrier β in such a manner to straddle the two sub-carriers (the sub-carrier α and the sub-carrier β). In other words, according to the RQAM modulation system, mapping is performed on not a single frequency but on a plurality of frequencies.

Figure 5:
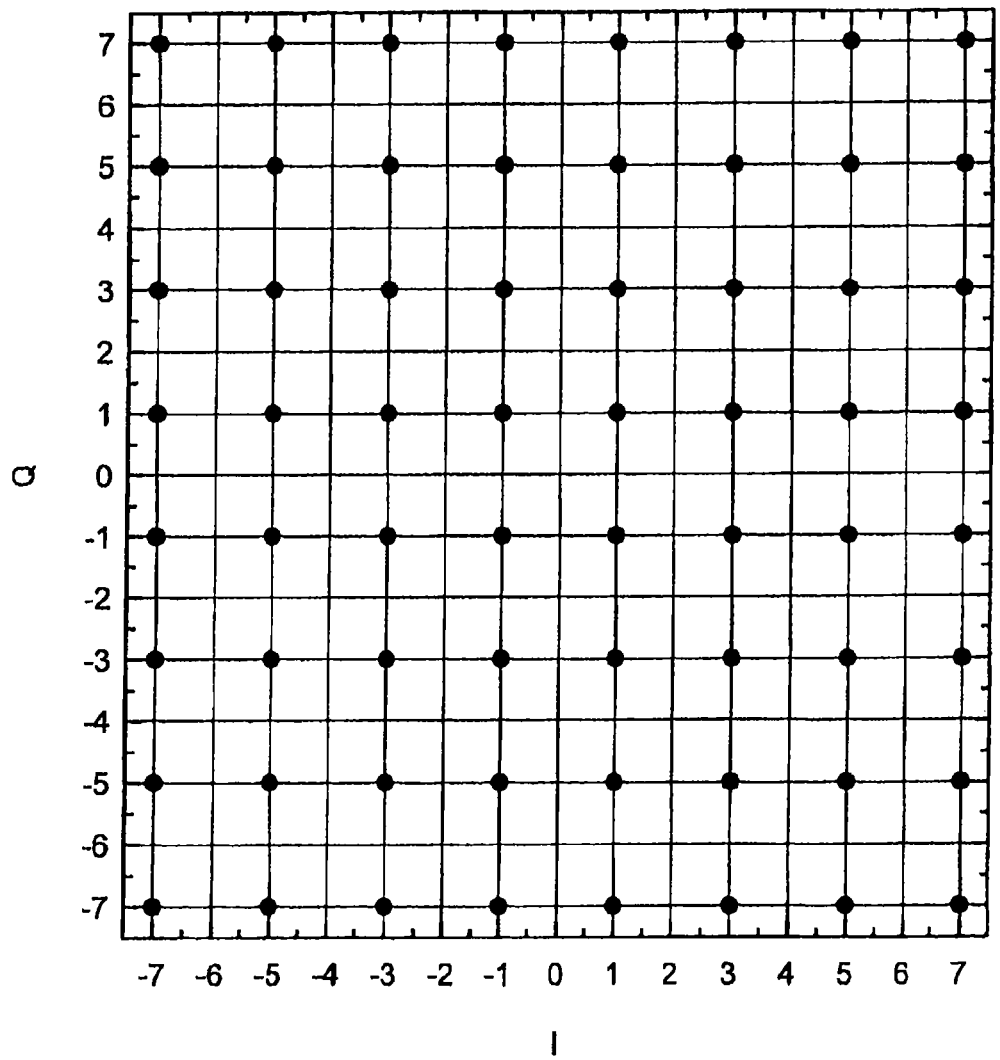
FIG. 5 depicts a signal point arrangement of a conventional 64QAM mapping.
Figure 6:
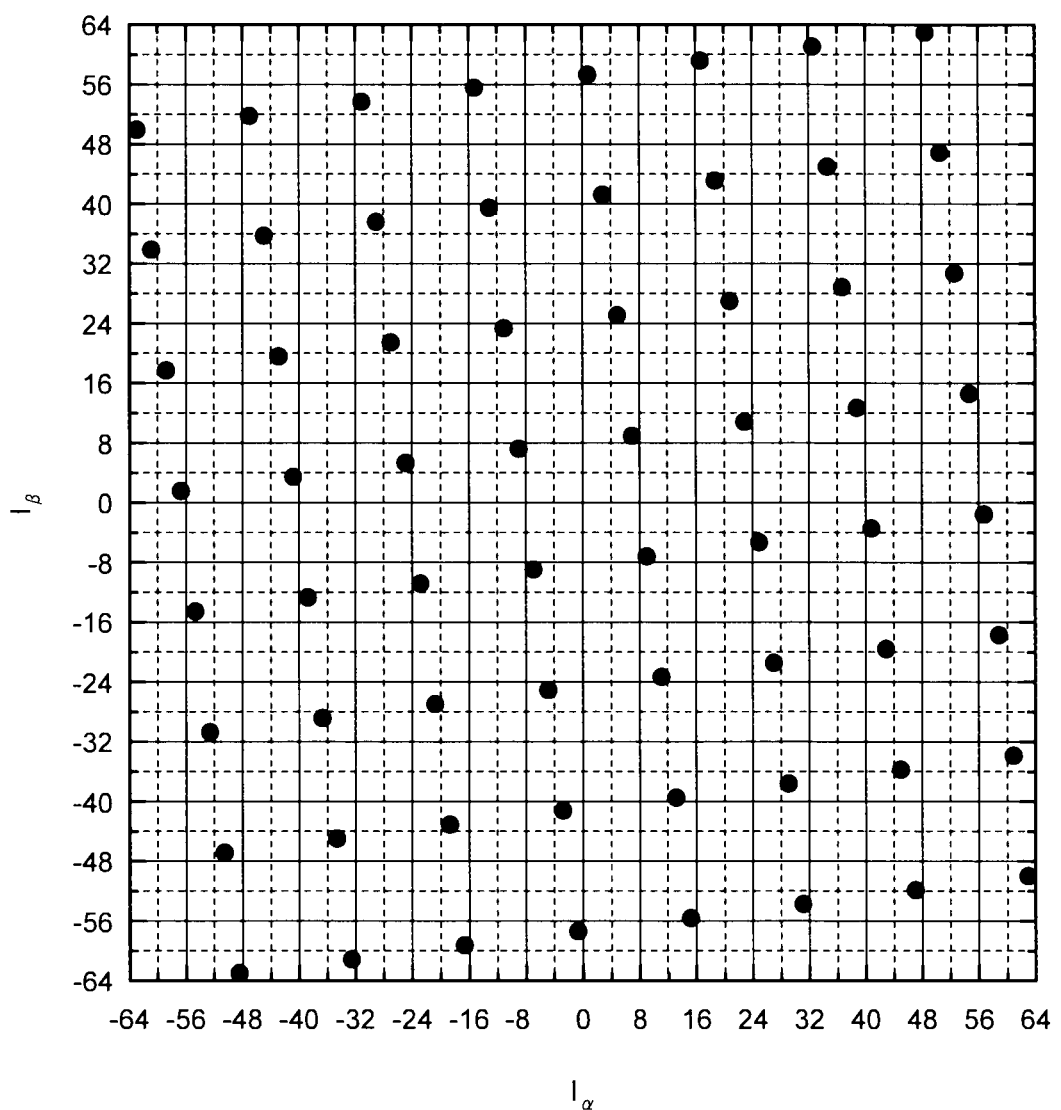
FIG. 6 is an example of a signal point arrangement of a 64RQAM mapping.

While an example of the 16RQAM mapping has been explained with reference to FIG. 4, a similar method may be applied to the 64RQAM mapping. FIG. 5 depicts a signal point arrangement of a conventional 64QAM mapping. FIG. 6 is an example of a signal point arrangement of a 64RQAM mapping obtained by applying the expression (5) to the 64QAM mapping depicted in FIG. 5.

In practice, in order to provide a mean power of signal point of 1, each of the I-axis values and Q-axis values in FIG. 5 is multiplied by a value of an expression (8) below. Similarly, each of the I-axis values and Q-axis values in FIG. 6 is multiplied by a value of an expression (9) below. FIGS. 5 and 6 depict values before the multiplication of the respective values for the purpose of explanation.

$$\frac{1}{\sqrt{42}} \quad (8)$$

$$\frac{1}{\sqrt{2730}} \quad (9)$$

Further, the applicable mapping system is not limited to the 16QAM mapping or the 64QAM mapping, but for example, it may be applied to 256QAM and the like in which one symbol is converted into multivalued 8-bit.

Figure 7:
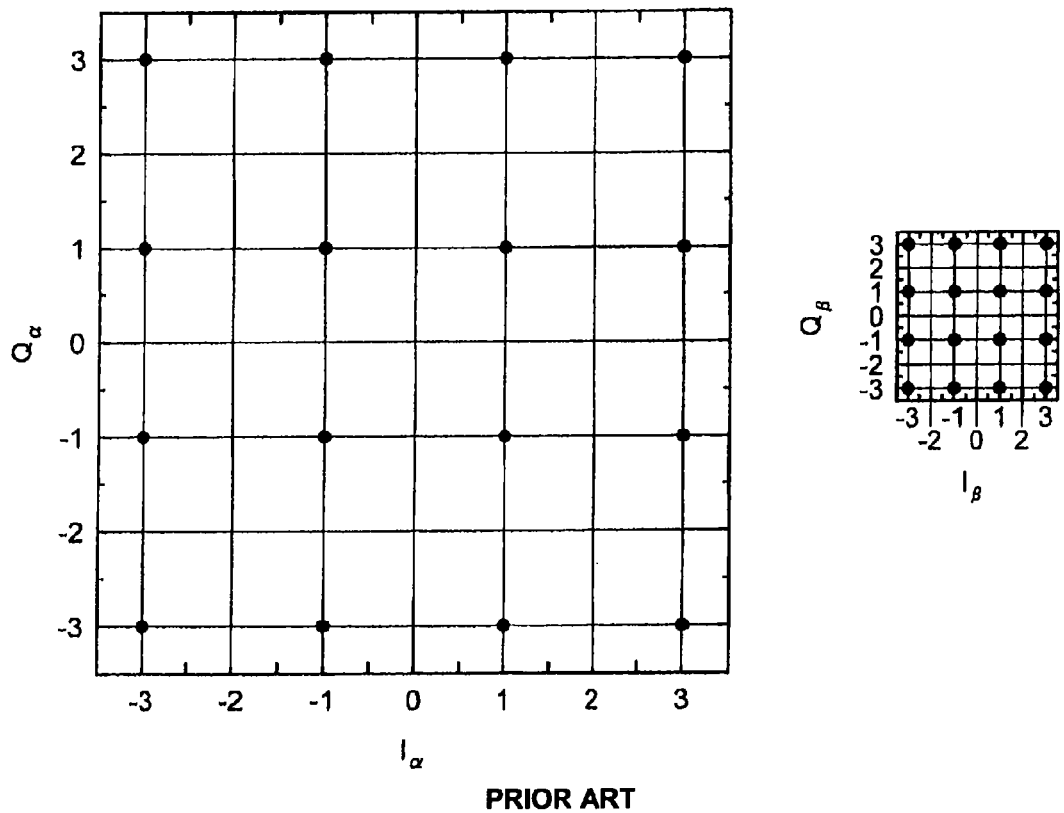
FIG. 7 is a schematic diagram of an image of a received signal by the conventional 16QAM mapping.

An improvement in communication characteristics by the modulation system according to the first embodiment will be described next. FIG. 7 is a schematic diagram of an image of a received signal by the conventional 16QAM mapping. FIG. 8 is a schematic diagram of an image of a received signal by the 16RQAM mapping according to the first embodiment.

A received signal may vary among the sub-carriers by about 10 dB to 20 dB in a multipath environment. In this case, the communication characteristics vary for each sub-carrier in the conventional 16QAM modulation system as illustrated in FIG. 7. That is, a characteristic difference between a sub-carrier with superior communication characteristics and a sub-carrier with inferior communication characteristics may occasionally appear in the extreme.

Meanwhile, because transmission is performed by straddling different sub-carriers (the sub-carrier α and the sub-carrier β) in the 16RQAM mapping, the diversity effect may be obtained as illustrated in FIG. 8, and thus a distance between received signal points can be extended. Accordingly, the communication characteristics can be improved.

Figure 9:
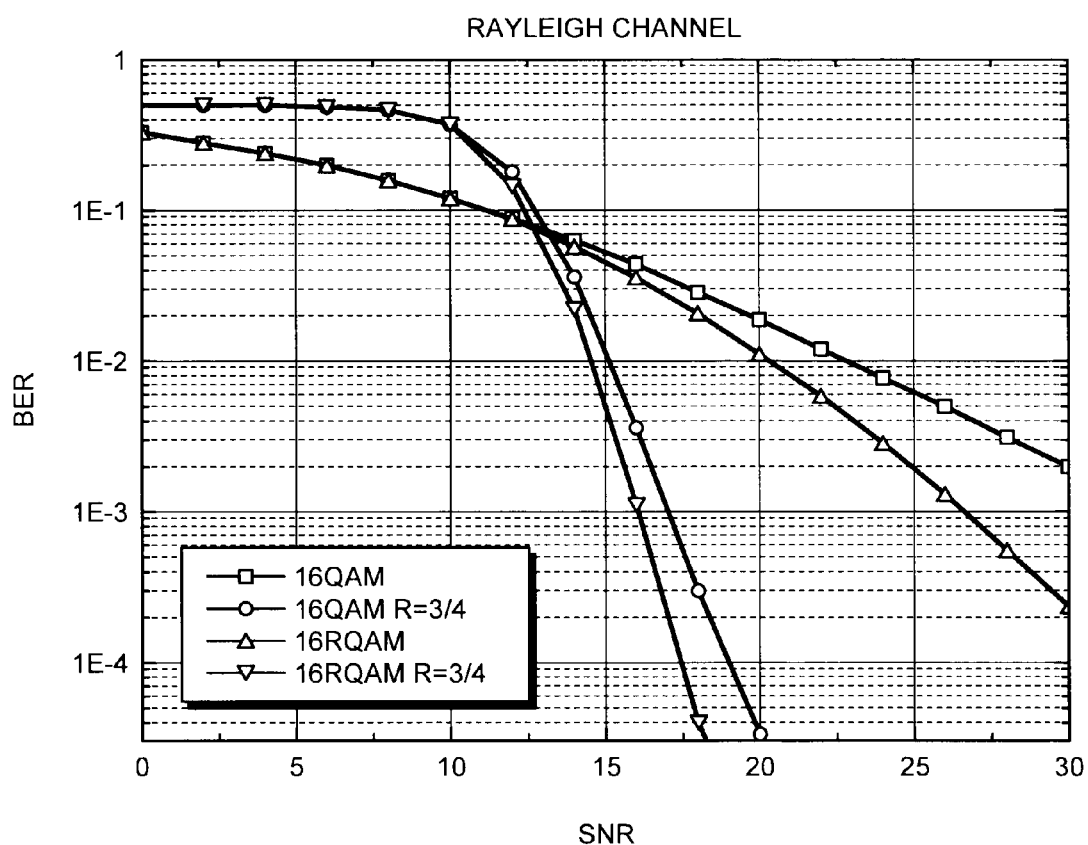
FIG. 9 is an example of communication characteristics of the 16RQAM mapping.
Figure 10:
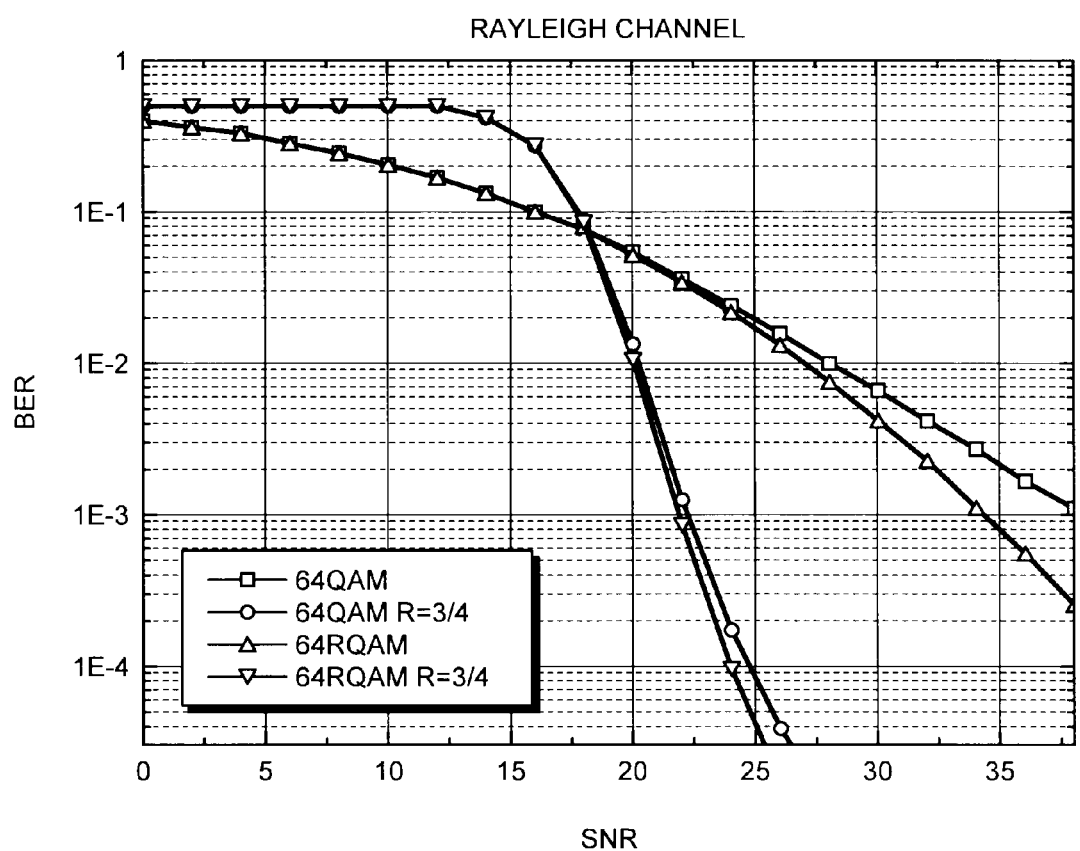
FIG. 10 is an example of communication characteristics of the 64RQAM mapping.

FIG. 9 is an example of communication characteristics (BER (Bit Error Rate) characteristics) of a 16RQAM mapping obtained as a result of an evaluation by computer simulation. FIG. 10 is an example of BER characteristics of a 64RQAM mapping.

In FIGS. 9 and 10, an evaluation is performed assuming that a transmission path is in a frequency selective fading environment, that is, the transmission path has Rayleigh distribution characteristics on a frequency axis. The 16QAM modulation and the 64QAM modulation are selected as the conventional technique and a result of comparison with the 16RQAM the 64RQAM is indicated in FIGS. 9 and 10. Further, FIGS. 9 and 10 depict two cases, that is, a case without error correction and a case using a convolutional code (with a coding rate of ¾). The horizontal axis in FIGS. 9 and 10 indicates SNR (Signal to Noise Ratio) and the vertical axis indicates BER.

As illustrated in FIGS. 9 and 10, the communication characteristics (BER characteristics) are improved as compared to the conventional modulation system due to the diversity effect. Although not depicted in the drawings, same characteristics as those of the conventional modulation system appear in an AWGN (Additive white Gaussian noise) environment.

As described above, the transmission device according to the first embodiment can map transmitting signals in such a manner to straddle a plurality of sub-carriers in multi-carrier communications by a mapping system provided by modifying the conventional QAM mapping. Therefore, the diversity effect and multivalues may be achieved at the same time and the communication characteristics in the multipath environment may be improved. That is, by changing the conventional QAM mapping for a transmission device to the RQAM mapping, same characteristics as those of the QAM modulation may be obtained in the AWGN environment and characteristics superior to those of the QAM modulation may be obtained in the multipath environment due to the diversity effect.

Second Embodiment

A transmission device according to a second embodiment spreads inputted signals in a frequency direction and in a time direction by interleaving and then performs the RQAM mapping according to the first embodiment.

Figure 11:
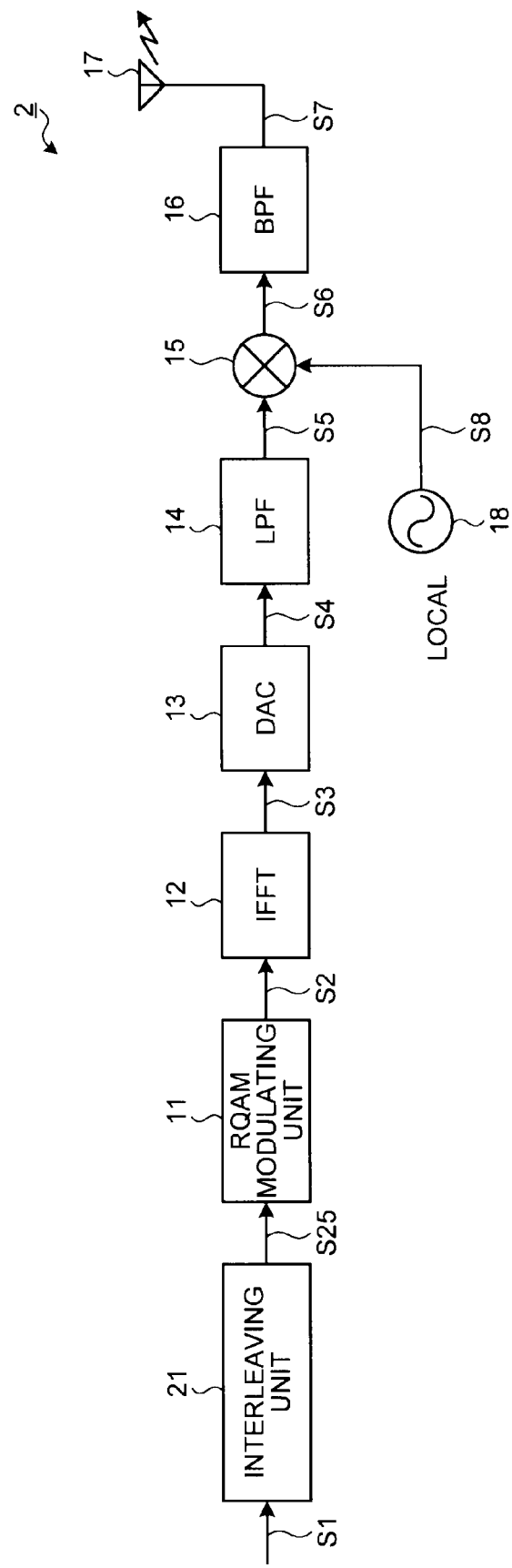
FIG. 11 is a block diagram of a transmission device according to a second embodiment.

FIG. 11 is a block diagram of a transmission device 2 according to the second embodiment. As illustrated in FIG. 11, the transmission device 2 includes an interleaving unit 21, the RQAM modulating unit 11, the IFFT 12, the DAC 13, the LPF 14, the Mixer 15, the BPF 16, the antenna 17, and the LOCAL OSCILLATOR 18.

The second embodiment is different from the first embodiment in that the interleaving unit 21 is added to the transmission device. Other configurations and functions of the second embodiment are identical to those illustrated in FIG. 1, which is a block diagram of the configuration of the transmission device 1 according to the first embodiment, and thus like reference numerals are denoted to like elements and explanations thereof will be omitted.

The interleaving unit 21 is a block for spreading an inputted signal in a frequency direction and in a time direction. This signal spreading may prevent continuous bit strings from being mapped into the same sub-carrier. The diversity effect is thus expected to be obtained more easily. A signal S25 in FIG. 11 indicates a bit string obtained by interleaving the signal S1 as an information bit series inputted to the transmission device 2.

Third Embodiment

A transmission device according to a third embodiment performs an error correction coding process to inputted signals and then performs the RQAM mapping according to the first embodiment.

Figure 12:
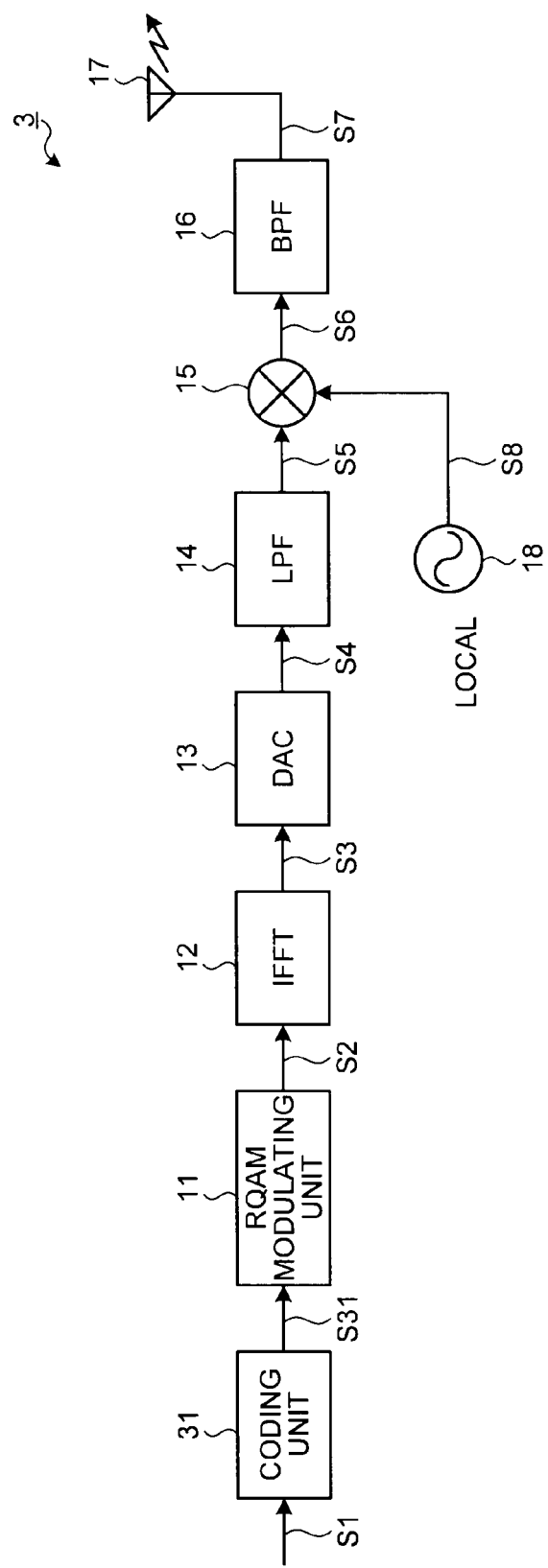
FIG. 12 is a block diagram of a transmission device according to a third embodiment.

FIG. 12 is a block diagram of a transmission device 3 according to a third embodiment. As illustrated in FIG. 12, the transmission device 3 includes a coding unit 31, the RQAM modulating unit 11, the IFFT 12, the DAC 13, the LPF 14, the Mixer 15, the BPF 16, the antenna 17, and the LOCAL OSCILLATOR 18.

The third embodiment is different from the first embodiment in that the coding unit 31 is added to the transmission device. Other configurations and functions of the third embodiment are identical to those illustrated in FIG. 1, which is a block diagram of the configuration of the transmission device 1 according to the first embodiment, and thus like reference numerals are denoted to like elements and explanations thereof will be omitted.

The coding unit 31 performs an error correction coding process to inputted signals. Accordingly, when an error occurs in a transmission path, the error may be corrected at a receiving side. This may reduce BER and an increase in channel capacity and a decrease in communication delay are expected. A signal S31 illustrated in FIG. 11 indicates a bit string obtained by error correction coding the signal S1 as an information bit series inputted to the transmission device 3.

Fourth Embodiment

A transmission device according to a fourth embodiment applies an RQAM mapping to single carrier communication.

Figure 13:
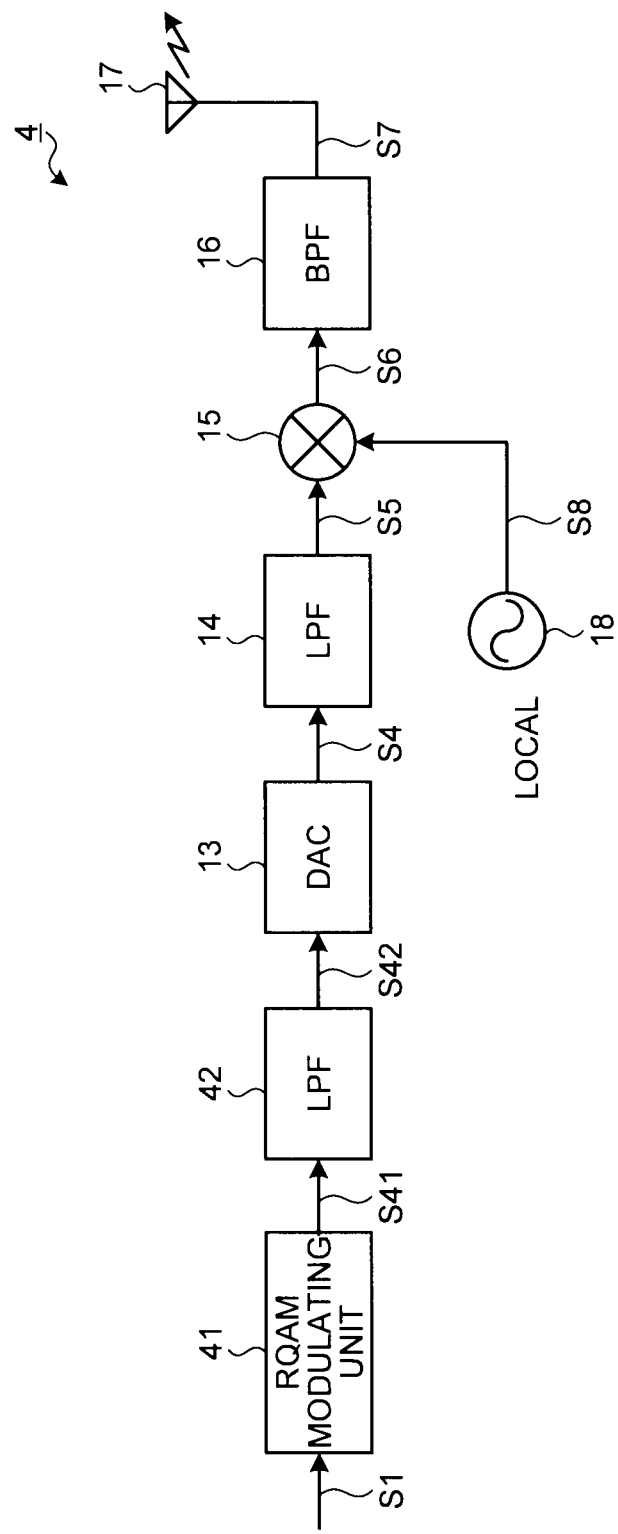
FIG. 13 is a block diagram of a transmission device according to a fourth embodiment.
Figure 14:
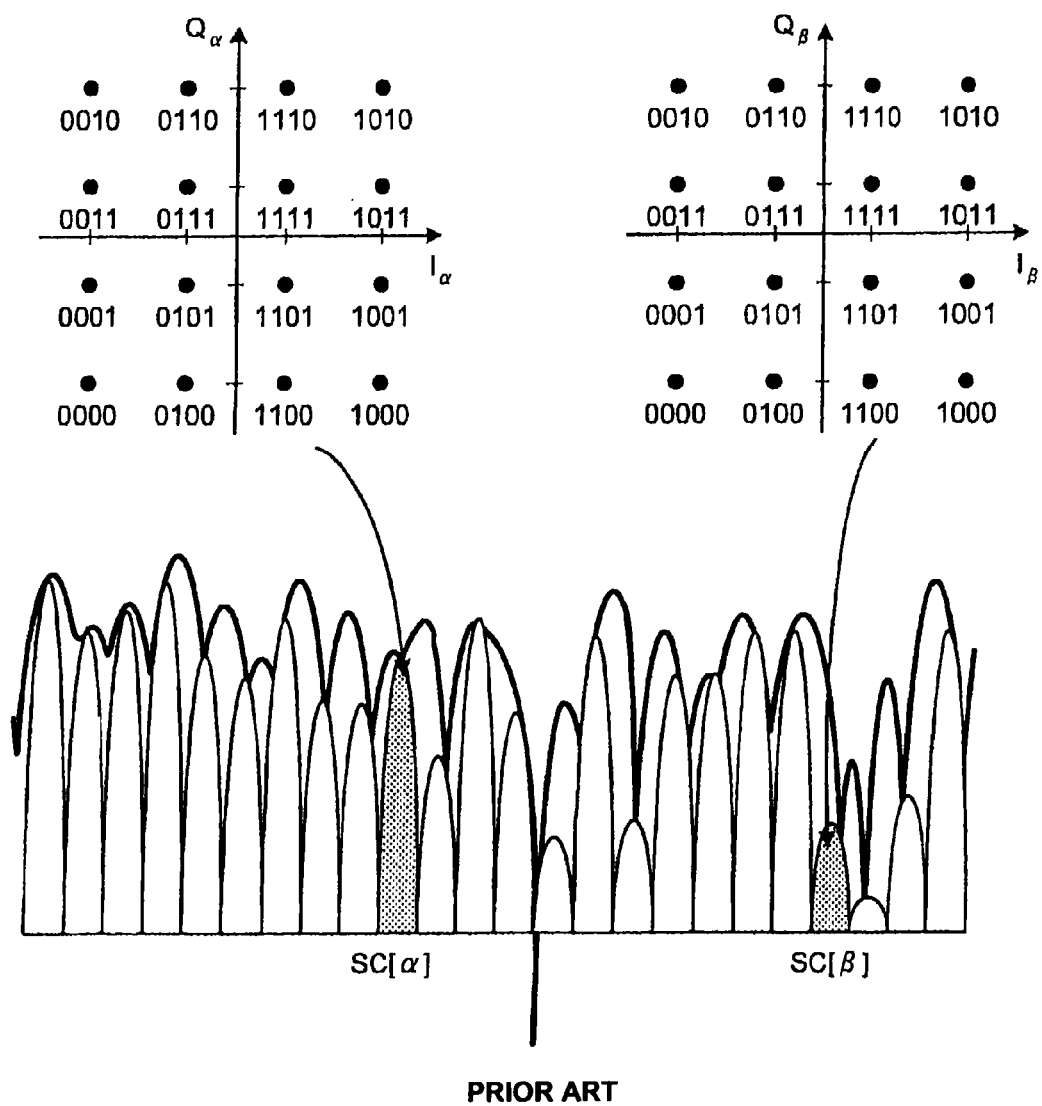
FIG. 14 is a schematic diagram of a communication image in a multipath environment.

FIG. 13 is a block diagram of a transmission device 4 according to the fourth embodiment. As illustrated in FIG. 13, the transmission device 4 includes an RQAM modulating unit 41, an LPF 42, the DAC 13, the LPF 14, the Mixer 15, the BPF 16, the antenna 17, and the LOCAL OSCILLATOR 18.

The fourth embodiment is different from the first embodiment in a function of the RQAM modulating unit 41 and the LPF 42 instead of the IFFT 12. Other configurations and functions of the fourth embodiment are identical to those illustrated in FIG. 1, which is a block diagram of the configuration of the transmission device 1 according to the first embodiment, and thus like reference numerals are denoted to like elements and explanations thereof will be omitted.

The RQAM modulating unit 41 performs an RQAM mapping on a transmitting signal in such a manner to straddle a plurality of symbols transmitted by single carrier. The RQAM modulating unit 11 according to the first embodiment performs the RQAM mapping on a transmitting signal in such a manner to straddle a plurality of sub-carriers in multi-carrier communications to aim at the diversity effect in the frequency direction. Meanwhile, the RQAM modulating unit 41 according to the fourth embodiment aims at the diversity effect in the time direction. The RQAM modulation system is effective even for single carrier when a transmission path varies at a higher speed than the communication time.

The LPF 42 is a block for shaping a waveform of a square signal inputted by the RQAM modulating unit 41 for attenuating a harmonic component of a frequency. A signal S41 in FIG. 13 indicates a time signal outputted as a result of the RQAM mapping. A signal S42 indicates a signal whose waveform is shaped by the LPF 42.

The fourth embodiment may be configured to perform an interleave process with an aim of eliminating correlation in the time direction as described in the second embodiment, or may be configured to perform a coding process for performing error correction on a receiving side as described in the third embodiment.

INDUSTRIAL APPLICABILITY

As described above, the transmission device and the modulation system according to the present invention are useful as a transmission device and a modulation system in a wireless communication system with varying transmission paths such as in a multipath environment, and are particularly applicable to a transmission device and a modulation system using multi-carriers.

The invention claimed is:

1. A transmission device for transmitting a modulated signal including an in-phase component and an orthogonal component, the transmission device comprising:
    a dividing unit that divides a transmitting signal indicating information to be transmitted into a first signal and a second signal;
    a mapping unit that maps the first signal into a first in-phase component and a second in-phase component by a predetermined mapping system and the second signal into a first orthogonal component and a second orthogonal component by the mapping system;
    a generating unit that generates a first modulated signal including the first in-phase component and the first orthogonal component and a second modulated signal including the second in-phase component and the second orthogonal component; and
    a transmitting unit that transmits the first modulated signal and the second modulated signal.

2. The transmission device according to claim 1, wherein the mapping unit maps the first signal into the first in-phase component as an in-phase component of a first sub-carrier included in a plurality of sub-carriers used for multi-carrier communications and the second in-phase component as an in-phase component of a second sub-carrier included in the sub-carriers, and maps the second signal into the first orthogonal component as an orthogonal component of the first sub-carrier and the second orthogonal component as an orthogonal component of the second sub-carrier, and
    the generating unit generates the first modulated signal of the first sub-carrier including the first in-phase component and the first orthogonal component and the second modulated signal of the second sub-carrier including the second in-phase component and the second orthogonal component.

3. The transmission device according to claim 1, wherein the mapping unit maps the first signal into the first in-phase component as an in-phase component of a first symbol of single carrier used for communications of a single carrier system and the second in-phase component as an in-phase component of a second symbol of the single carrier, and maps the second signal into the first orthogonal component as an orthogonal component of the first symbol and the second orthogonal component as an orthogonal component of the second symbol, and
    the generating unit generates the first modulated signal of the first symbol including the first in-phase component and the first orthogonal component and the second modulated signal of the second symbol including the second in-phase component and the second orthogonal component.

4. The transmission device according to claim 1, further comprising an interleaving unit that interleaves the transmitting signal, wherein
    the dividing unit divides the interleaved transmitting signal into the first signal and the second signal.

5. The transmission device according to claim 1, further comprising a coding unit that performs error correction coding with respect to the transmitting signal, wherein the dividing unit divides the transmitting signal, which has been error-corrected, into the first signal and the second signal.

6. A transmission device for transmitting a modulated signal including an in-phase component and an orthogonal component, the transmission device comprising:
- a dividing unit that divides a transmitting signal indicating information to be transmitted into a first signal and a second signal;
- a mapping unit that maps the first signal into a first in-phase component and a second in-phase component by a predetermined mapping system and the second signal into a first orthogonal component and a second orthogonal component by the mapping system;
- a generating unit that generates a first modulated signal including the first in-phase component and the first orthogonal component and a second modulated signal including the second in-phase component and the second orthogonal component; and
- a transmitting unit that transmits the first modulated signal and the second modulated signal,
- wherein the mapping unit maps the first signal into the first in-phase component and the second in-phase component and the second signal into the first orthogonal component and the second orthogonal component by the mapping system in which signal points are arranged based on whew coordinates obtained by converting coordinates of signal points arranged by a $2^{2N}$-QAM (Quadrature Amplitude Modulation) modulation system using an expression (1), an expression (2), or an expression (3) as follows:

$$\frac{1}{\sqrt{2^{2N}+1}}\begin{pmatrix} 2^N & 1 \\ 1 & -2^N \end{pmatrix} \quad (1)$$

$$\frac{1}{\sqrt{2^{2N}+1}}\begin{pmatrix} 2^N & -1 \\ 1 & 2^N \end{pmatrix} \quad (2)$$

$$\frac{1}{\sqrt{2^{2N}+1}}\begin{pmatrix} 2^N & 1 \\ -1 & 2^N \end{pmatrix} \quad (3)$$

wherein N is a positive integer.

7. A modulation method performed by a transmission device for transmitting a modulated signal including an in-phase component and an orthogonal component, the modulation method comprising:
- a step of dividing, by a dividing unit, a transmitting signal indicating information to be transmitted into a first signal and a second signal;
- a step of mapping, by a mapping unit, the first signal into a first in-phase component and a second in-phase component by a predetermined mapping system and the second signal into a first orthogonal component and a second orthogonal component by the mapping system; and
- a step of generating, by a generating unit, a first modulated signal including the first in-phase component and the first orthogonal component and a second modulated signal including the second in-phase component and the second orthogonal component.

* * * * *